US009628429B2

(12) United States Patent
Kallayil

(10) Patent No.: US 9,628,429 B2
(45) Date of Patent: Apr. 18, 2017

(54) DISPLAY OF COMMON USER INTERESTS ON SUBSCRIPTION TO A USER'S SOCIAL FEED

(71) Applicant: Google Inc., Mountain View, CA (US)

(72) Inventor: Gopinath Neelambaran Kallayil, Redwood Shores, CA (US)

(73) Assignee: Google Inc., Mountain View, CA (US)

( * ) Notice: Subject to any disclaimer, the term of this patent is extended or adjusted under 35 U.S.C. 154(b) by 274 days.

(21) Appl. No.: 13/728,931

(22) Filed: Dec. 27, 2012

(65) Prior Publication Data

US 2017/0041276 A1  Feb. 9, 2017

(51) Int. Cl.
*H04L 12/58* (2006.01)

(52) U.S. Cl.
CPC .................. *H04L 51/32* (2013.01)

(58) Field of Classification Search
CPC ................. G06Q 50/01; H04L 51/32
See application file for complete search history.

(56) References Cited

U.S. PATENT DOCUMENTS

| | | | | |
|---|---|---|---|---|
| 2005/0171799 A1* | 8/2005 | Hull | ................. | G06Q 10/107 705/319 |
| 2009/0157795 A1* | 6/2009 | Black | ................. | G06Q 10/10 709/202 |
| 2009/0222348 A1* | 9/2009 | Ransom et al. | ................. | 705/14 |
| 2012/0150960 A1* | 6/2012 | Nalawade | ................. | 709/204 |
| 2013/0066967 A1* | 3/2013 | Alexander | ................. | G06Q 50/01 709/204 |
| 2013/0067114 A1* | 3/2013 | Hjelm et al. | ................. | 709/243 |
| 2013/0212491 A1* | 8/2013 | Yerli | ................. | H04L 51/32 715/753 |
| 2013/0290449 A1* | 10/2013 | Norby et al. | ................. | 709/206 |
| 2013/0311900 A1* | 11/2013 | Schleier-Smith | ................. | H04L 65/403 715/753 |
| 2013/0340097 A1* | 12/2013 | Gowel | ................. | 726/28 |
| 2014/0114738 A1* | 4/2014 | Tseng et al. | ................. | 705/14.27 |

* cited by examiner

*Primary Examiner* — Joe Chacko
(74) *Attorney, Agent, or Firm* — McDermott Will & Emery LLP

(57) ABSTRACT

A system and method is disclosed for determining why a first user has indicated a desire to associate with a second user in an online social network. The first user initiates a request to associate with the second user. When the request is received at the system of the subject technology, one or more signals related to how the first user discovered the second user in the social network are determined, and a message is generated based on the one or more signals. A notification is provided to the second user that includes the message and an indication of the request to convey why the first user indicated a desire to associate with the second user. In some aspects, the subject technology will determine and display, in the notification, common interests that the users share so that the notified user can better evaluate the request.

20 Claims, 4 Drawing Sheets

DISPLAY OF COMMON USER INTERESTS ON SUBSCRIPTION TO A USER'S SOCIAL FEED

BACKGROUND

Online social networks allow users to interact by posting messages to individual and common message feeds. Additionally, a first user may search for and discover other users using search terms that correspond to an interest of the first user. The first user may then subscribe to a second user's social network message feed, for example, by requesting to be added to a social graph associated with the second user, or by subscribing to a public message feed that does not require permission. A notification may then be provided to the second user (for example, within the message feed) to alert the second user of the subscription or request.

SUMMARY

The subject technology provides a system and method for conveying, within a notification, why a first user has indicated a desire to associate with a second user in an online social network. According to one aspect, a computer-implemented method may include receiving, from a first user, a request to associate with a second user in an online social network, determining one or more signals related to how the first user discovered the second user in the social network, generating a message based on the one or more signals, and providing, to the second user, the message along with an indication of the request to associate with the second user. Other aspects include corresponding systems, apparatus, and computer program products.

The previously described aspects and other aspects may include one or more of the following features. For example, the request to associate may be generated on the first user subscribing to a public message feed associated with the second user. The request to associate may comprise a request from the first user to be connected with the second user in a social graph.

The method may further comprise analyzing a series of actions that were performed by the first user before the request was received, and determining, from the series of actions, one or more interactions between the first user and content related to the second user, the one or more signals being based on the one or more interactions. In this regard, at least one interaction may comprise the first user performing a search that includes at least a portion of a name for the second user. At least one interaction may comprise the first user viewing a message posted in the social network by the second user. At least one interaction may comprise the first user hyperlinking to a document from the posted message. At least one interaction may comprise the first user forming an association with one or more users who are in a social graph with the second user. At least one interaction may comprise the second user forming an association with one or more users who are in a social graph with the first user. At least one interaction comprises the first user picking the second user from a list of users displayed to the first user in the social network.

Additionally or in the alternative, determining the one or more signals may comprise determining one or more common interests between the first and second users, and wherein the message describes the one or more common interests. In this respect, determining one or more common interests may comprise analyzing information provided by the first user and the second user in respective user profiles for common terms or group affiliations. Determining one or more common interests may comprise analyzing information provided by the first user and the second user in respective user profiles for terms within a predetermined degree of separation from each other. Determining one or more common interests may comprise analyzing a first series of actions performed by the first user and a second series of actions performed by the second user, and, based on the first and second series of actions, determine subject matter that was viewed by both the first user and the second user before the request was received.

In another aspect, a machine-readable medium may have instructions stored thereon that, when executed, cause a machine to perform a method of conveying, within a notification, why a first user has indicated a desire to associate with a second user in an online social network. In this regard, the method may include receiving a request to connect the first user with the second user in the social network, determining one or more actions performed by the first user in the social network leading up to the request, determining one or more common interests between the first and second users, generating message content based on the one or more actions and the one or more common interests, and providing, to the second user, a message indicating the request and comprising the message content. Other aspects include corresponding systems, apparatus, and computer program products.

The previously described aspects and other aspects may include one or more of the following features. For example, the method may further comprise facilitating storage of an action log associated with the first user, the action log comprising the one or more actions performed by the first user, and determining, from the action log, one or more interactions between the first user and content related to the second user, the one or more actions being based on the one or more interactions. In this regard, determining the one or more interactions may comprise determining the one or more interactions were performed by the first user within a predetermined period of time before the request was made. Determining the one or more interactions may comprise determining that the first user viewed content provided by the second user to an activity stream. Additionally or in the alternative, determining one or more common interests may comprise facilitating the storage of a first action log associated with the first user and a second activity log with a second user, wherein an action log comprises actions performed by a respective user before the request was made, and analyzing the first action log and the second action log to determine subject matter that was viewed by both the first user and the second user.

In a further aspect, a system may include one or more processors, and a memory. The memory may include server instructions thereon that, when executed, cause the one or more processors to receive an indication that a first user initiated an association with a second user in the social network, determine one or more actions performed by the first user before the indication was received, the actions related to one or more interactions between the first user and content related to the second user, determine one or more common interests between the first and second users, generate message content based on the one or more actions and the one or more common interests, and provide, to the second user, a notification of the indication, the notification comprising the message content.

These and other aspects may provide one or more of the following advantages. A user receiving a request to join a social graph or otherwise associate with another user is provided with notification of why the user initiated the request, so that the notified user can make an informed decision as to whether the notified user should accept the request. In addition, by providing information in the request about common interests shared between the notified user and the requesting user, and actions performed by the requesting user that led up to the request, a notified user is saved cognitive resources measured in the effort and time that would otherwise be required to determine the nature of the request or review a profile of the requesting user, and may use that time to perform other tasks or activities within, or unrelated to, the social network.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
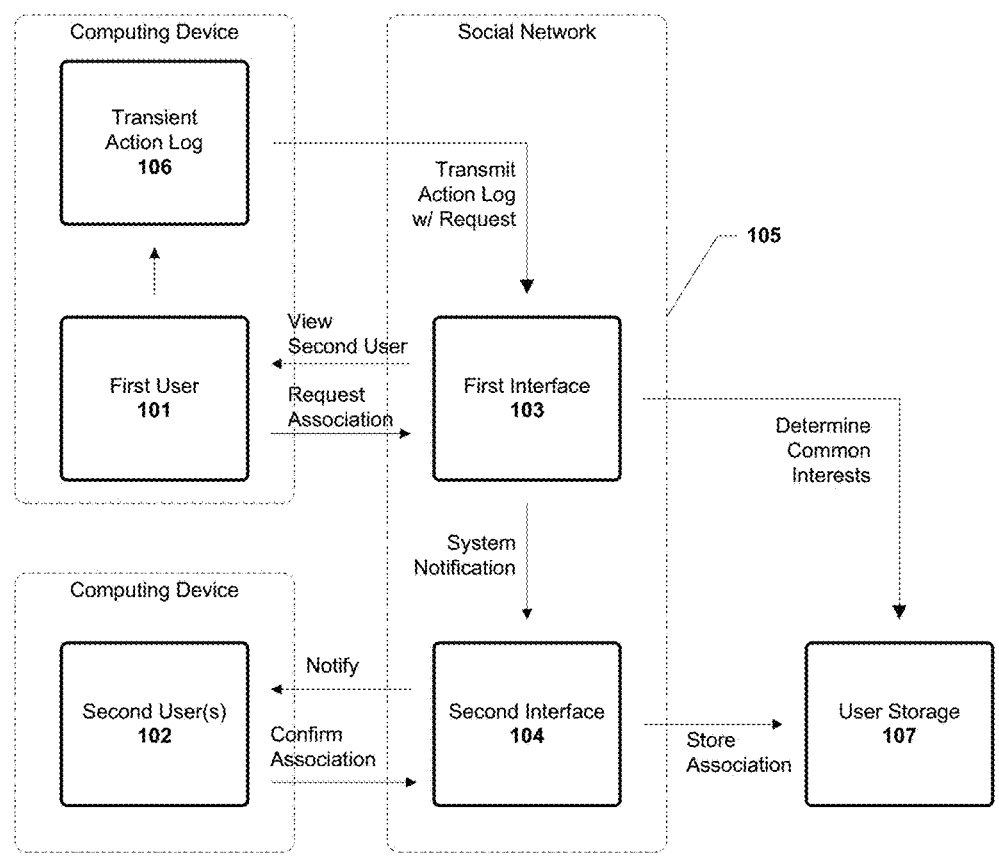
FIG. 1 is a diagram of example components for conveying, within a notification, why a first user has indicated a desire to associate with a second user in an online social network.

FIG. 1 is a diagram of example components for conveying, within a notification, why a first user has indicated a desire to associate with a second user in an online social network according to one aspect of the subject technology. One or more users of a social network may access an activity stream to post representations of their activities (including, for example, character-based messages, pictures, video, or the like), and to review activities posted by other users. In one example implementation, a first user 101 and second user 102 access a first interface 103 and second interface 104 provided by a social network 105. First interface 103 and second interface 104 may be displayed as one or more web pages accessible by a web browser over a network (for example, a WAN, LAN, Internet, or the like). In this regard, the web browser may be displayed on a respective computing device (for example, a smartphone, GPS navigation device, or personal computer, tablet computer, PDA, a television or other display device with one or more location-aware computing devices embedded therein or attached thereto) for user-interaction with social network 105.

A user may browse social network to view user activities in an activity stream. Activities may include messages between users or related to articles viewed by other users, expressions of endorsement or disapproval of other activities, a sharing of an activity by one user with other users, or the like. For example, second user 102 may view and share with other users an activity within the activity stream that originates from a user in a social graph with second user 102, or originates from users in a different social graph. An activity stream is provided as one example medium for displaying and sharing activities between users, and is merely one example of displaying such activities. In this regard, the activity stream of the subject technology may be interchangeable with any means in which online content is shared between users.

While browsing social network 105, first user 101 may encounter second user's 102 profile. First user 101 may have encountered second user 102 by way of a search, selected second user 102 from a list of users, by viewing a message or other content related to second user 102 displayed in a message feed, or the like. In this regard, first user 101 may have encountered second user 102 while viewing an endorsement made by second user 102. First user 101 may have determined that second user 102 is interesting because second user 102 is a member of a friend's social graph. If first user 101 is currently not in a social graph with second user 102, first user 101 may send second user 102 a request to associate with first user 101 by requesting to join a common social graph, or by subscribing to second user's 102 social activity feed.

According to the subject technology, social network 105 provides a mechanism for conveying, via a notification, why a user has indicated a desire to associate with another user. When an association between the first and second user is initiated, for example, when first user 101 requests to be added to the second user's 101 social graph or activity feed, social network 105 first determines why the request was initiated and then notifies second user 102 as to why the request was initiated. One or more signals related to how the first user discovered the second user in the social network are determined, and these signals are used to construct the notification.

In some aspects, on authorization from a user, the subject technology maintains a transient (for example, temporary) action log 106 of actions performed by the user in social network 105. For example, transient action log 106 may record, for a predetermined period of time, historical action data, including a user's viewing history (for example, including articles and message feeds), user searches (for example, including search terms), or the like. In this regard, action data is collected for the limited purpose of determining, on the user requesting an association with another user, why the requested that association. Historical action data is encrypted and then stored for windows of predetermined periods of time (for example, the last 24 hours).

In the implementation depicted by FIG. 1, transient action log 106 is stored locally on the user's computing device (for example, in memory). In other implementations, the user may authorize the system to allow remote storage of the historical action data on a central server (for example, in a data cloud). In this respect, the historical action data is stored in connection with the user's user account, such that the historical action data is accessible only by the user, or for the purpose of the subject technology when the user is authenticated (signed in) to the user account. During a social network session, the computing device may periodically inform the user (for example, by way of a blinking icon on the device's display screen) that the device is collecting historical action data. Social network 105 may include setup screens, accessible from first interface 103 or second interface 104, that enable the user to purge stored action data, and/or disable further collection of action data.

When first user 101 initiates a request to associate with second user 102, the subject technology analyzes action log 106 to determine one or more events that led up to the discovery of second user 102. In this regard, action log 106 may, on submission of the request, be automatically transmitted to social network 105 from first user's 101 computing device, or from a remote storage associated with first user's 101 user account.

A sequence of events determined from action log 106 is one behavioral signal indicating why first user 101 selected second user 102. Other behavioral signals used to convey why first user 101 desired to associate with second user 102 may include the number of affiliations related to second user 102 that first user 102 recently formed a connection with (for example, in the last 3 days), the number of times first user 101 engaged in content related to second user 102 (for example, clicked on a profile of second user 102, or viewed an article posted by second user 102), and the like. Social network 105 then provides a notification or message to second user 102, specifying that first user 101 wishes to associate with second user 102. The content of the notification or message is constructed automatically, based on the determined behavioral signals of first user 101. For example, a message may inform second user 102 that "User A has subscribed to your public message feed because User A viewed an article you recently posted about dogs."

Additionally or in the alternative, the notification may include common interests shared between the users. When the request is initiated by first user 101, the subject technology may access a storage 107 (for example, a database) associated with social network 105. Storage 107 stores user information that users of social network 105 have chosen to display on their profile pages, including information about where they were born, where they live, what schools they went to, birthday or other dates of interest, general hobbies and other interests, and the like. In one aspect, the subject technology analyzes information stored by first user 101 and second user 102, and determines one or more common interests between the users.

Common interests may be determined from explicit interests provided by each user stored in storage 107 for a public profile, group affiliations of the users, or implied interests determined from similar patterns of activity within the social network. For example, patterns of activity may include types of articles viewed, how many times the first user viewed a particular article or photo posted by the second user, or the like. In some aspects, implied interests may be determined from analyzing messages posted or shared by both users for matching terms, or terms within a predetermined degree of separation. After determining common interests for the users, the subject technology may construct the notification to be sent to second user 102 based on the determined common interests. For example, second user 102 may receive a notification informing second user 102 that "User A has subscribed to your public message feed because you recently connected with 4 friends of User A, and User A shares a common interest in dogs with you."

Figure 2:
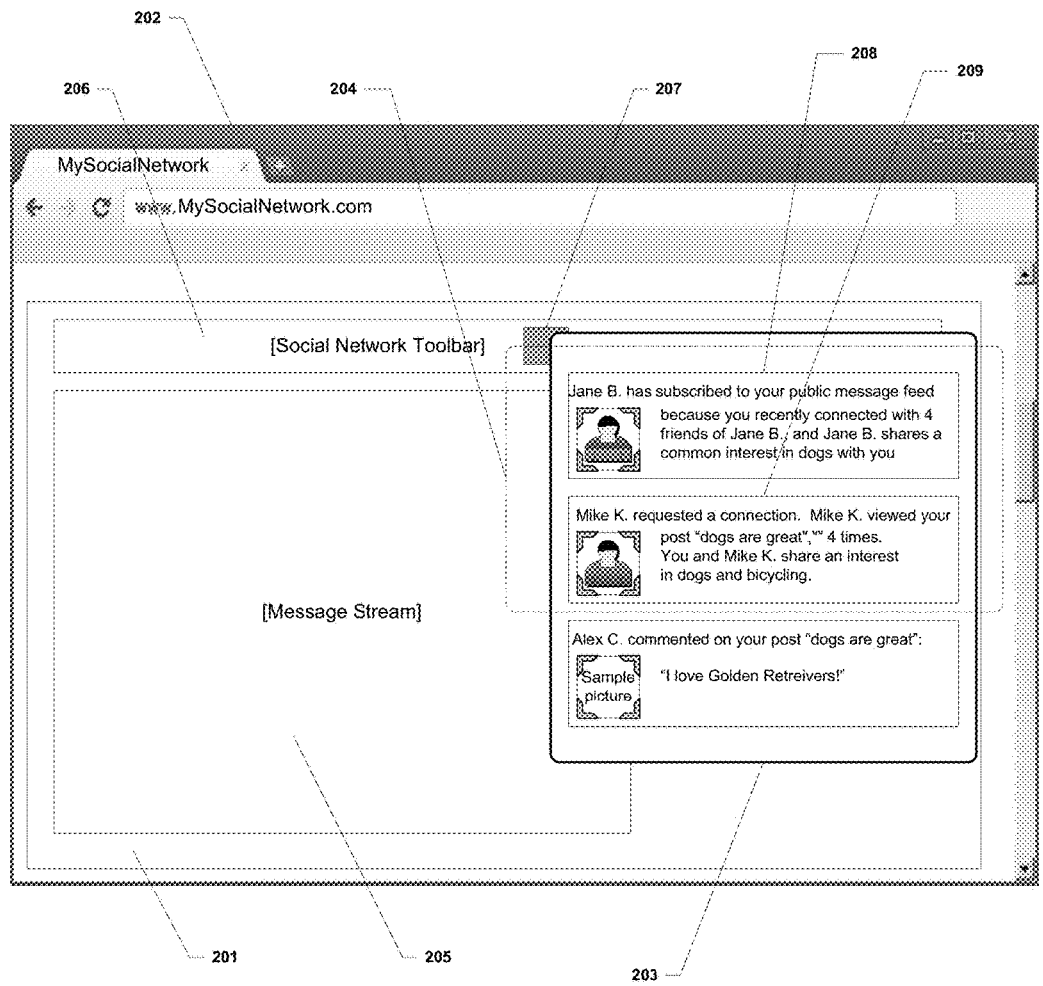
FIG. 2 depicts an example webpage of a social network, displayed by a web browser, including a notification list for displaying notifications related to activities in a user's social graph or activity stream.

FIG. 2 depicts an example webpage 201 of a social network, displayed by a web browser 202, including a notification list 203 for displaying notifications 204 related to activities in a user's social graph or activity stream 205. In the depicted example, web browser 202 may be displayed on a client computing device, for example, a smartphone, GPS navigation device, or personal computer, tablet computer, PDA, a television or other display device with one or more location-aware computing devices embedded therein or attached thereto, or the like. Activity stream 205 may include a sequential display of information where users' activities are streamed in substantially real-time. Activity stream 205 may be viewable by only a single user, or may be shared between users with each user viewing only those activities that are relevant to the user viewing the activity. A social networking toolbar 206 may include a number of buttons for the manipulation of the social network, including activity stream 205. Toolbar 206 may further include a control 207 that, when activated, displays notification list 203 within web browser 202, above and at least partially overlapping at least a portion of webpage 201. In some aspects, notification list 203 may float (for example, above activity stream 205), and may be repositioned within web browser 202 by the user. Notification list 203 may be generated, for example, by instructions (for example, scripting language) embedded within webpage 201.

Notification list 203 operates to notify authorized users (for example, first user 101 or second user 102) of recent activities posted to activity stream by other users in the same social graph (for example, when an activity is posted by a user). Notification list 203 may include a list of notifications 204. For example, one for each activity. In this regard, each notification 204 may be generated as a result of a recent activity of interest to the user within activity stream 205. The activity may include, for example, the posting of an activity to activity stream 205, or one or more replies to the activity made by one or more other users. In this manner, notification list 203 may provide a concise listing of recent activities of interest within the social graph of the user viewing notification list 203. Each notification 204 may function as a visual hyperlink to a respective activity in activity stream 205, such that, when activated (for example, by clicking on an area of a display screen corresponding to the notification), web browser 202 may be navigated to a webpage that displays the activity and any associated photos or documents, or messages in reply to the activity.

In the depicted example, notification list 203 displays two notifications. A first notification 208 informs the user that another user "Jane B" has subscribed to the user's message feed. The subject technology, on analyzing an activity log for the subscribing user, has determined that the notified user has recently (for example, in the last three days) connected with four individuals in the subscribing user's social graph. The subject technology has also determined, on analyzing the user profiles of the subscribing user and the notified user, that the two users share a common interest in "dogs." Notification list 203 displays this information to the notified user to provide a better understanding as to why the subscribing user indicated a desire to associate with the notified user.

Similarly, notification list 203 displays a second notification 209 that informs the notified user that "Mike K" requested a connection. For this action, the subject technology has analyzed the activity log for the subscribing user and determined that the subscribing user has viewed an article that was previously posted by the notified user. Again, the subject technology includes common interests between the users. Because the user receiving the notification is better informed about the action, the user can choose to allow the subscription or confirm the request to associate.

Figure 3:
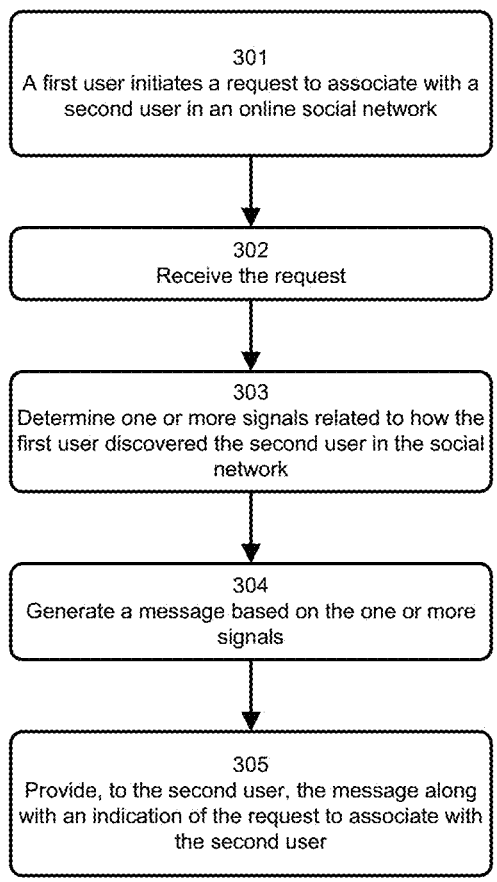
FIG. 3 is a flowchart illustrating a first example process for determining why a first user has indicated a desire to associate with a second user in an online social network.
Figure 4:
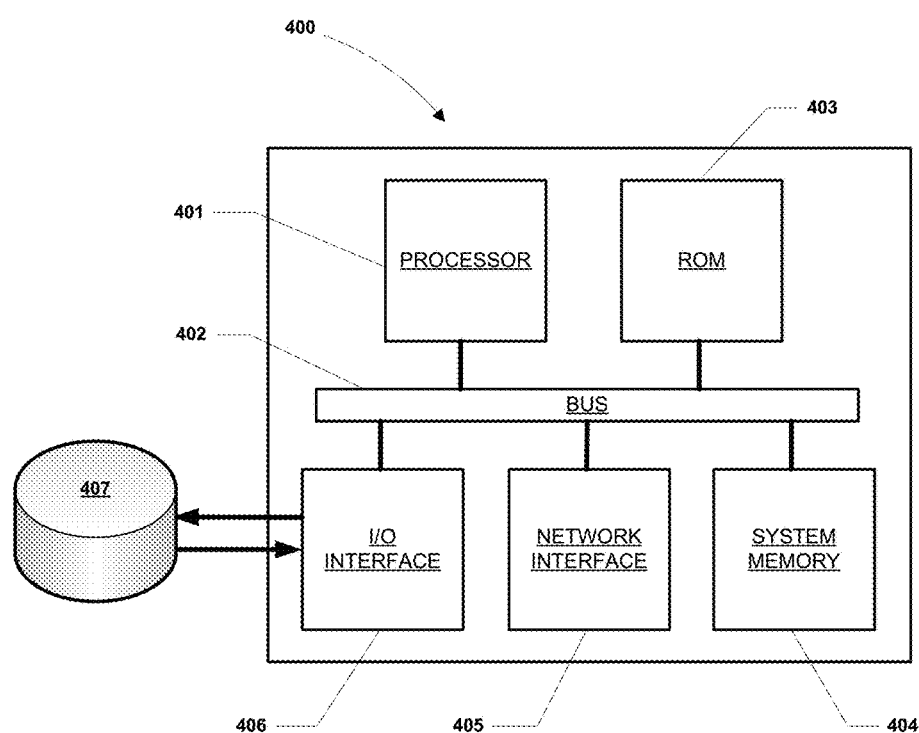
FIG. 4 is a diagram illustrating an example server system for determining why a first user has indicated a desire to associate with a second user in an online social network.

FIG. 3 is a flowchart illustrating a first example process for determining why a first user has indicated a desire to associate with a second user in an online social network according to one aspect of the subject technology. According to some aspects, the blocks of FIG. 3 may be executed by one or more computing devices (for example, a desktop or server computer, tablet or notebook computer, personal data assistant, smart phone, a television or other display device with one or more computing devices embedded therein or attached thereto, or the like). In this regard, the blocks of FIG. 3 may be performed within the context of an online social network application provided by the one or more computing devices.

In block 301, a first user initiates a request to associate with a second user in an online social network. In some aspects, the request to associate is generated on the first user subscribing to a public message feed associated with the second user. In other aspects, the request is a message, initiated by the first user, requesting that the first user be connected with the second user. For example, the first user may request that the second user join the first user's social graph, or vice versa. In block 302, the request is received, for example, by the previously described one or more computing devices providing the social network.

In block 303, one or more signals related to how the first user discovered the second user in the social network are determined. In one implementation, a series of actions performed by the first user before the request was received are analyzed to identify one or more interactions between the first user and online content related to the second user. This series of actions may be stored in the previously described action log. Online content may include messages posted to a message stream, webpages or documents (for example, articles, blog posts, or photos or videos) endorsed or shared by the second user, or the like. Accordingly, the subject technology analyzes only those stored actions that were performed by the first user within a predetermined period of time before the request was made. For example, the subject technology may analyze actions recorded over the last three days, the last twenty-four hours, recorded during the current session, or the like.

Various types of interactions may be recorded and used to determine how the first user discovered the second user. For example, at least one interaction may include the first user performing a search that includes at least a portion of a name for the second user. At least one interaction may include the first user viewing a message posted in the social network by the second user. At least one interaction may include the first user hyperlinking to a document from the posted message. At least one interaction may include the first user forming an association with one or more users who are in a social graph with the second user, or vice versa. At least one interaction may include the first user picking the second user from a list of users displayed to the first user in the social network.

Additionally or in the alternative, determining the one or more signals may include determining one or more common interests between the first and second users. Determining one or more common interests may include, for example, analyzing information provided by the first user and the second user in respective user profiles for common terms or group affiliations, analyzing information provided by the first user and the second user in respective user profiles for terms within a predetermined degree of separation from each other, or analyzing the previously described action logs of the users to determine subject matter that was viewed by both the first user and the second user before the request was received. In this respect, the message describes the one or more determined common interests.

In block 304, a message is generated based on the one or more determined signals. In one aspect, the message may include predefined text or text describing the first user's request to associate with the second user. The one or more determined signals may be described in the message, generally. For example, if the request was generated as a result of another user adding the notified user to a social graph, then the context information may include predefined text stating that "[User A] has added you to their social graph." In some aspects, the message may further include a hyperlink to the online profile of the user who posted the initiated the request (for example, a name or partial name). As depicted by FIG. 2, the content of the message may simply indicate common interests determined for the users, or description of actions leading up to the request that are determined to be the strongest indicators of why the request was initiated.

In block 305, the message is provided (for example, sent or transmitted) to the second user along with an indication of the request to associate with the second user. As described previously, but without limiting the scope of the subject technology, the notification may be part of a notification list, or may take the form of an email message, post to the first and/or second user's activity feed, instant message, text message, or any other message that has the ability to communicate the message content and indicate the request.

FIG. 5 is a diagram illustrating an example computing system for determining why a first user has indicated a desire to associate with a second user in an online social network, including a processor and other internal components, according to one aspect of the subject technology. In some aspects, a computerized device 500 (for example, a computing device responsible for hosting social network 105, a computing device for displaying web browser 202, or the like) includes several internal components such as a processor 501, a system bus 502, read-only memory 503, system memory 504, network interface 505, I/O interface 506, and the like. In one aspect, processor 501 may also be communication with a storage medium 507 (for example, a hard drive, database, or data cloud) via I/O interface 506. In some aspects, all of these elements of device 500 may be integrated into a single device. In other aspects, these elements may be configured as separate components.

Processor 501 may be configured to execute code or instructions to perform the operations and functionality described herein, manage request flow and address mappings, and to perform calculations and generate commands. Processor 501 is configured to monitor and control the operation of the components in server 500. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 501. Likewise, one or more sequences of instructions may be software stored and read from ROM 503, system memory 504, or received from a storage medium 507 (for example, via I/O interface 506). ROM 503, system memory 504, and storage medium 507 represent examples of (for example, non-transitory) machine or computer readable media on which instructions/code may be executable by processor 501. Machine or computer readable media may generally refer to any medium or media used to provide instructions to processor 501, including both volatile media, such as dynamic memory used for system memory 504 or for buffers within processor 501, and non-volatile media, such as electronic media, optical media, and magnetic media.

In some aspects, processor 501 is configured to communicate with one or more external devices (for example, via I/O interface 506). Processor 501 is further configured to read data stored in system memory 504 or storage medium 507 and to transfer the read data to the one or more external devices in response to a request from the one or more external devices. The read data may include one or more web pages or other software presentation to be rendered on the one or more external devices. The one or more external devices may include a computing system such as a personal computer, a server, a workstation, a laptop computer, PDA, smart phone, and the like.

In some aspects, system memory 504 represents volatile memory used to temporarily store data and information used to manage device 500. According to one aspect of the subject technology, system memory 504 is random access memory (RAM) such as double data rate (DDR) RAM. Other types of RAM also may be used to implement system memory 504. Memory 504 may be implemented using a single RAM module or multiple RAM modules. While system memory 504 is depicted as being part of device 500, those skilled in the art will recognize that system memory 504 may be separate from device 500 without departing from the scope of the subject technology. Alternatively, system memory 504 may be a non-volatile memory such as a magnetic disk, flash memory, peripheral SSD, and the like.

I/O interface 506 may be configured to be coupled to one or more external devices, to receive data from the one or more external devices and to send data to the one or more external devices. I/O interface 506 may include both electrical and physical connections for operably coupling I/O interface 506 to processor 501, for example, via the bus 502. I/O interface 506 is configured to communicate data, addresses, and control signals between the internal components attached to bus 502 (for example, processor 501) and one or more external devices (for example, a hard drive). I/O interface 506 may be configured to implement a standard interface, such as Serial-Attached SCSI (SAS), Fiber Channel interface, PCI Express (PCIe), SATA, USB, and the like. I/O interface 506 may be configured to implement only one interface. Alternatively, I/O interface 506 may be configured to implement multiple interfaces, which are individually selectable using a configuration parameter selected by a user or programmed at the time of assembly. I/O interface 506 may include one or more buffers for buffering transmissions between one or more external devices and bus 502 or the internal devices operably attached thereto.

Various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of blocks in the processes disclosed is an illustration of example approaches. Based upon design preferences, it is understood that the specific order or hierarchy of blocks in the processes may be rearranged. Some of the blocks may be performed simultaneously. The accompanying method claims present elements of the various blocks in a sample order, and are not meant to be limited to the specific order or hierarchy presented.

The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method, comprising:
   recording historical action data comprising actions performed by a first user within an online social network;
   receiving, from a first user, a request to associate with a second user in an online social network;
   determining, from the historical action data and in response to the request, a series of actions related to the second user and performed by the first user using the online social network within a predetermined period of time before the request was received;

determining, based on the series of actions, one or more behavioral signals related to why the first user requested to associate with the second user in the social network;

generating a message based on the one or more behavioral signals; and providing, to the second user, the message along with an indication of the request to associate with the second user.

2. The computer-implemented method of claim 1, wherein the request to associate is generated on the first user subscribing to a public message feed associated with the second user.

3. The computer-implemented method of claim 1, wherein the request to associate comprises a request from the first user to be connected with the second user in a social graph.

4. The computer-implemented method of claim 1, further comprising:

determining, from the series of actions, one or more interactions between the first user and content related to the second user, the one or more behavioral signals being based on the one or more interactions.

5. The computer-implemented method of claim 4, wherein at least one interaction comprises the first user performing a search that includes at least a portion of a name for the second user.

6. The computer-implemented method of claim 4, wherein at least one interaction comprises the first user viewing a message posted in the social network by the second user.

7. The computer-implemented method of claim 6, wherein at least one interaction comprising the first user hyperlinking to a document from the posted message.

8. The computer-implemented method of claim 4, wherein at least one interaction comprises the first user forming an association with one or more users who are in a social graph with the second user.

9. The computer-implemented method of claim 4, wherein at least one interaction comprises the second user forming an association with one or more users who are in a social graph with the first user.

10. The computer-implemented method of claim 4, wherein at least one interaction comprises the first user picking the second user from a list of users displayed to the first user in the social network.

11. The computer-implemented method of claim 1, wherein determining the one or more behavioral signals comprises determining one or more common interests between the first and second users, and wherein the message describes the one or more common interests.

12. The computer-implemented method of claim 11, wherein determining one or more common interests comprises:

processing information provided by the first user and the second user in respective user profiles for common terms or group affiliations.

13. The computer-implemented method of claim 11, wherein determining one or more common interests comprises:

processing information provided by the first user and the second user in respective user profiles to determine terms within a predetermined degree of separation from each other.

14. The computer-implemented method of claim 11, wherein determining one or more common interests comprises:

processing a first series of actions performed by the first user and a second series of actions performed by the second user; and based on processing the first and second series of actions, determine subject matter that was viewed by both the first user and the second user before the request was received.

15. A non-transitory machine-readable medium having instructions stored thereon that, when executed, cause a machine to perform a method for determining why a first user has indicated a desire to associate with a second user in an online social network, the method comprising:

recording historical action data comprising actions performed by a first user within an online social network;

receiving a request to connect the first user with the second user in the social network;

determining, from the historical action data and in response to the request, one or more actions related to the second user and performed by the first user using the social network within a predetermined period of time leading up to the request;

determining one or more common interests between the first and second users;

generating message content based on the one or more actions and the one or more common interests; and providing, to the second user, a message indicating the request and comprising the message content.

16. The non-transitory machine-readable medium of claim 15, further comprising:

facilitating storage of an action log associated with the first user, the action log comprising the one or more actions performed by the first user; and determining, from the action log, one or more interactions between the first user and content related to the second user, the one or more actions being based on the one or more interactions.

17. The non-transitory machine-readable medium of claim 16, wherein determining the one or more interactions comprises:

determining the one or more interactions were performed by the first user within a predetermined period of time before the request was made.

18. The non-transitory machine-readable medium of claim 16, wherein determining the one or more interactions comprises:

determining that the first user viewed content provided by the second user to an activity stream.

19. The non-transitory machine-readable medium of claim 15, wherein determining one or more common interests comprises:

facilitating storage of a first action log associated with the first user and a second activity log with a second user, wherein an action log comprises actions performed by a respective user before the request was made; and processing the first action log and the second action log to determine subject matter that was viewed by both the first user and the second user.

20. A system, comprising:

one or more processors; and a memory, the memory including server instructions thereon that, when executed, cause the one or more processors to:

record historical action data comprising actions performed by a first user within an online social network;

receive an indication that a first user initiated an association with a second user in the online social network;

determine, from the historical action data and in response to receiving the indication, one or more actions related to the second user and performed by the first user using the online social network within a predetermined time before the indication was received, the actions related to one or more interactions between the first user and content related to the second user;

determine one or more common interests between the first and second users;

generate message content based on the one or more actions and the one or more common interests; and provide, to the second user, a notification of the indication, the notification comprising the message content.

* * * * *